United States Patent
Makarow et al.

(10) Patent No.: US 11,137,036 B2
(45) Date of Patent: Oct. 5, 2021

(54) CONTROL DEVICE WITH AN ELECTRIC MOTOR FIXED IN A MOTOR MOUNTING

(71) Applicant: Mahle International GmbH, Stuttgart (DE)

(72) Inventors: Eugen Makarow, Ludwigsburg (DE); Edgar Salfeld, Lichtenwald (DE); Florian Wetzel, Baltmannsweiler (DE)

(73) Assignee: MAHLE INTERNATIONAL GMBH

( * ) Notice: Subject to any disclaimer, the term of this patent is extended or adjusted under 35 U.S.C. 154(b) by 204 days.

(21) Appl. No.: 16/374,740

(22) Filed: Apr. 3, 2019

(65) Prior Publication Data

US 2019/0309807 A1    Oct. 10, 2019

(30) Foreign Application Priority Data

Apr. 6, 2018  (DE) ...................... 10 2018 205 226.3

(51) Int. Cl.
*F16D 28/00*    (2006.01)
*H02K 5/04*    (2006.01)

(52) U.S. Cl.
CPC ............... *F16D 28/00* (2013.01); *H02K 5/04* (2013.01); *F16D 2500/1023* (2013.01); *H02K 2205/00* (2013.01)

(58) Field of Classification Search
CPC ............ F16D 2500/1023; F16D 28/00; H02K 2205/00; H02K 5/04; H02K 5/10; H02K 7/116

(Continued)

(56) References Cited

U.S. PATENT DOCUMENTS 3,035,238 A * 5/1962 Bouchard .............. H02K 24/00
                                                        336/30
4,498,230 A * 2/1985 Harris .................... H02K 5/148
                                                        29/597

(Continued)

FOREIGN PATENT DOCUMENTS

DE    102007052574 A1    5/2009
DE    102016206954 A1    10/2017

(Continued)

OTHER PUBLICATIONS

Translation of foreign document DE 102016206954 A1 (Year: 2017).*

(Continued)

*Primary Examiner* — Alex W Mok
(74) *Attorney, Agent, or Firm* — Fishman Stewart PLLC (57) ABSTRACT

An electric control device for actuating an actuator may include an electric motor including a rotor for driving the actuator and a substantially cylindrical stator housing having an axial lower side and a circumferential shell. The axial lower side may merge into the circumferential shell via a circumferential edge. The control device may also include an equipment housing including a substantially cylindrical motor mounting which at an axial end is sealed by a mounting bottom and in which the electric motor is arranged with the axial lower side facing the mounting bottom. On the axial lower side, a central, axially projecting motor end portion may be disposed. In the motor mounting between the circumferential shell of the stator housing and the equipment housing, an annular space may be defined. The annular space may be at least partly filled with an adhesive which attaches the stator housing to the equipment housing.

20 Claims, 5 Drawing Sheets

(58) Field of Classification Search
USPC .......................................................... 310/89
See application file for complete search history.

(56) References Cited

U.S. PATENT DOCUMENTS

| | | | | |
|---|---|---|---|---|
| 5,744,880 | A * | 4/1998 | Kudoh | B60L 50/52 |
| | | | | 310/58 |
| 6,359,355 | B1 * | 3/2002 | Hartsfield | H02K 1/148 |
| | | | | 310/254.1 |
| 7,216,625 | B2 | 5/2007 | Ikeda et al. | |
| 2010/0047091 | A1 * | 2/2010 | Schiffhauer | H02K 9/14 |
| | | | | 417/410.1 |
| 2013/0328308 | A1 * | 12/2013 | Won | F01N 5/04 |
| | | | | 290/43 |
| 2014/0021832 | A1 | 1/2014 | Palfenier et al. | |
| 2014/0144412 | A1 * | 5/2014 | An | F02B 37/18 |
| | | | | 123/562 |
| 2016/0118858 | A1 * | 4/2016 | Ojima | H02K 9/005 |
| | | | | 310/52 |
| 2016/0190756 | A1 * | 6/2016 | Froebel | H02K 23/62 |
| | | | | 310/232 |
| 2017/0321612 | A1 | 11/2017 | Fujinaka et al. | |

FOREIGN PATENT DOCUMENTS

| | | | | |
|---|---|---|---|---|
| EP | 0561345 | A1 | 9/1993 | |
| EP | 0874444 | A1 * | 10/1998 | ............. H02K 1/185 |
| WO | 2009056311 | A1 | 5/2009 | |
| WO | 2015048957 | A2 | 4/2015 | |
| WO | WO-2018016177 | A1 * | 1/2018 | ............. H02K 15/12 |
| WO | WO-2020129597 | A1 * | 6/2020 | ............. H02K 7/116 |

OTHER PUBLICATIONS

Translation of foreign document WO 2015048957 A2 (Year: 2015).*
English Abstract translation of DE-102016206954.
English abstract for EP-0561345.
Grote et al, Dubbel-Taschenbuch für den Maschinenbau, Springer Vieweg, 2018.
German search report dated Mar. 15, 2019.

* cited by examiner

Fig. 5 though this it is made possible to reduce the vibrations or deflect the same in the equipment housing.

CONTROL DEVICE WITH AN ELECTRIC MOTOR FIXED IN A MOTOR MOUNTING

CROSS-REFERENCE TO RELATED APPLICATION

This application claims priority to German Application No. DE 10 2018 205 226.3, filed on Apr. 6, 2018, the contents of which are hereby incorporated by reference in its entirety.

TECHNICAL FIELD

The present invention relates to an electric control device. The invention, in addition, relates to an exhaust gas turbocharger equipped with such a control device, for example for actuating a variable turbine geometry or for actuating a wastegate valve.

BACKGROUND

An electric control device usually comprises an electric motor for actuating an actuator. The electric motor comprises a stator and a rotor as well as a stator housing, in which the stator is arranged. The rotor is arranged in the stator and serves for driving the actuator. Usually, the control device additionally comprises an equipment housing, in which a motor mounting is formed, into which the electric motor can be inserted. When the electric motor is inserted in the motor mounting of the equipment housing, the electric motor has to be securely mounted and fixed in this equipment housing to prevent rotation, axial shifting and the movements that occur when exposed to vibrations. The electric motor and the equipment housing are also connected to one another by a screwed flange or by screws. By way of the screw connection or by way of the flange, the electric motor in the equipment housing is substantially mounted securely to prevent rotation, axial shifting and movements that occur when exposed to vibrations.

Here it is disadvantageous in particular that these solutions are relatively expensive and involved in the mounting and that the material relaxation that occurs during prolonged operation of the electric motor is offset only conditionally. When the control device is employed on an internal combustion engine or in a motor vehicle, the equipment housing or the regions of the screw connections are exposed to vibrations that occur during the operation of the internal combustion engine, wherein these vibrations are transmitted from the equipment housing or from the regions of the screw connections. When the electric motor is fixed in the equipment housing through these solutions, the relaxation caused by the vibrations that occurs on the surface of the equipment housing or in the regions of the screw connections is offset only conditionally. The relaxation is disadvantageous in particular during prolonged operation of the electric motor since the electric motor because of the relaxation can no longer be permanently fixed in the equipment housing. It is disadvantageous, furthermore, that a heat dissipation from the electric motor is frequently greatly restricted because of an air gap.

SUMMARY

The present invention therefore deals with the problem of stating an improved or at least alternative embodiment for a control device, which in particular overcomes the disadvantages known from the prior art.

According to the invention, this problem is solved through the subject of the independent claim(s). Advantageous embodiments are subject of the dependent claim(s).

The present invention is based on the general idea of providing an electric control device for actuating an actuator with an electric motor which comprises a substantially cylindrical stator housing and a rotor for driving the actuator, which is arranged in an equipment housing, which contains a substantially cylindrical motor mounting, which at an axial end is closed by a mounting bottom and into which the electric motor is inserted with the bottom side up front and is attached to the equipment housing by means of adhesive. By being glued into the motor mounting, the electric motor is secured against radial rotation. This is advantageous since by way of this a rotation of the electric motor, for example through the vibrations that are generated during the operation of an internal combustion engine is ideally completely prevented.

In a preferred embodiment, ribs which radially project into the motor mounting can be formed on the equipment housing, by way of which the electric motor is centred in the motor mounting. In particular, these ribs can be located in the region of the adhesive. These ribs centre the electric motor when the same is inserted in the motor mounting without additional assembly step in the motor mounting, as a result of which the time expenditure during the assembly can be lowered. With suitable dimensioning of the ribs, the electric motor following the insertion in the motor mounting is clamped in the motor mounting by the ribs. Because of this, the position of the electric motor in the motor mounting can be secured pending the curing of the adhesive. It is advantageous, furthermore, that further fastening elements, which are to prevent a radial rotation of the electric motor, can be omitted, as a result of which the costs during the assembly can be reduced. It is also conceivable that in the region of the lower motor mounting ribs are formed, which axially project into the motor mounting. The lower side of the electric motor merges into a shell via a circumferential edge, wherein on the lower side a centrally arranged and axially projecting motor end section is formed. In the motor mounting, an annular space extending along the shell is formed between the shell of the stator housing and the equipment housing. The annular space is at least partly filled up with adhesive which attaches the stator housing in the motor mounting to the equipment housing. In order to make possible a long lifespan and functional reliability of the electric motor, the heat that is generated during the operation of the electric motor has to be dissipated. For this purpose, the adhesive preferably has a thermal conduction coefficient that is greater than the thermal conduction coefficient of air. Ideally, the adhesive has a thermal conduction coefficient that is greater than the thermal conduction coefficient of the material of the equipment housing. Because of this, a thermal connection of the electric motor to the equipment housing that is better compared with conventional connections is made possible. The adhesive forms a type of thermal conduction pace in that the adhesive dissipates heat from the electric motor and feeds the dissipated heat to a heat sink that is formed by the equipment housing. It is advantageous, furthermore, to glue the electric motor in the motor mounting to the equipment housing, since this results in an improved vibration damping. It is advantageous, furthermore, that it is thereby made possible to fix the electric motor more cost-effectively and without major effort in the equipment housing. The electric motor is not connected to the equipment housing punctually, such as for example in the case of a screw connection, but over a larger surface area.

Because of this, the connection between the electric motor and the motor mounting of the equipment housing is only slightly influenced by material relaxation.

A possible embodiment proposes that laterally, next to the motor mounting in the equipment housing, at least two bores are formed into which at least two bores engage, as a result of which the electric motor is secured in the motor mounting against axial shifting. An axial shifting of the electric motor in the motor mounting can result in the function of the control device being negatively affected. Accordingly it is advantageous that the electric motor is secured against axial shifting by the screws engaging in the bores. It is conceivable that following the manufacture of the equipment housing, additional bores are formed in the equipment housing into which additional screws engage in order to offset particularly high axial loads on the electric motor. This is advantageous since during the manufacture of the control device the number of the bores or the number of the screw connections can be designed according to the magnitude of the probable load on the electric motor in the axial direction.

A further possible embodiment proposes that the at least two screws are formed as self-tapping screws. Because of this it is possible to embody the bores without thread. The thread is only formed by screwing-in the self-tapping screws. This is advantageous since accordingly a separate assembly step, in which a thread is produced in the bores, can be omitted. In order to make possible easy screwing-in of the self-tapping screws it is advantageous when the equipment housing is produced from plastic. It is conceivable that the electric motor and the equipment housing are attached to one another by means of adhesive. It is conceivable, furthermore, that the electric motor and the equipment housing are fastened to one another by hot-clinching two plastic domes. Because of this, the screws of the screw connection can be omitted. This is advantageous since this results in less effort during the assembly which lowers in particular the costs during the manufacture of the control device. In an alternative embodiment it can be provided that on the equipment housing laterally next to the motor mounting at least two plastic domes are formed, by way of which the electric motor is centred in the motor mounting, wherein the electric motor is hot-clinched to the at least two plastic domes. The at least two plastic domes are melted and transformed using force and heat. It is conceivable that the at least two plastic domes are formed from thermal plastics such as for example polyamide or polypropylene. By way of the plastic domes, a transmission of forces and torques between the electric motor and the equipment housing is made possible.

In a further alternative embodiment it can be provided that the motor end portion and the annular space are fluidically separated from one another by an annular seal. Because of this it is made possible to at least partly fill up the annular space with adhesive without the adhesive wetting the motor end portion.

According to a further embodiment it can be provided that the adhesive is located exclusively on a side of the seal facing away from the motor end portion. The electric motor is inserted in the motor mounting and the annular space is subsequently filled up at least partly with adhesive. To this end, the adhesive is introduced into the annular space from an axial upper end of the motor mounting, wherein the adhesive is subsequently distributed in the annular space and flows along the shell in the direction of the motor end portion. During this, the adhesive wets or covers parts of the shell. By way of the seal it is prevented that the adhesive flows as far as to the motor end portion. When the adhesive is exclusively located on a side of the seal facing away from the motor end portion, this is advantageous since because of this a contamination of the motor end portion by the adhesive is ideally prevented entirely, as a result of which it is made possible to render the motor end portion untight.

In a further alternative embodiment it can be provided that the seal lies against the stator housing and against a housing wall of the equipment housing delimiting the motor mounting. This is advantageous since because of this it is largely prevented that the adhesive between the seal and the stator housing or between the seal and the housing wall can flow from the side of the seal facing away from the motor end portion to the side of the seal facing the motor end portion. It is advantageous, furthermore, that through the seal lying against the stator housing and against the housing wall of the equipment housing, the vibrations of the electric motor are slightly damped.

Practically it can be provided that the seal is arranged at the height of the edge. This is advantageous since because of this the annular space can be substantially filled up with adhesive completely, wherein because of this the shell of the stator housing is covered by the adhesive over a large surface area, as a result of which a very good heat dissipation via the shell is made possible. When the shell or the stator housing is covered by the adhesive over a large surface area and accordingly is connected to the equipment housing in a stable manner, this results, furthermore, in a very good vibration damping. By way of the seal being arranged at the height of the edge, it is not only the motor end portion but also the lower side that is fluidically separated from the annular space. This is advantageous since because of this it is not only a contamination of the motor end portion but also a contamination of the lower side of the stator housing by the adhesive that is ideally prevented entirely, as a result of which it is made possible to render the motor end portion and the lower side untight.

Practically it can be provided that the seal is arranged on the stator housing axially spaced from the edge. Emanating from the axial end, the seal is arranged in particular on approximately a third of an axial height of the motor mounting. Because of this, it is not only the motor end portion and the lower side but also the regions of the annular space or regions of the shell facing the motor end portion that are fluidically separated from the remainder of the annular space. This is advantageous since because of this not only a contamination of the motor end portion and of the lower side caused by the adhesive but also a contamination of the regions of the shell adjoining the edge can be prevented. Accordingly, the regions of the shell adjoining the edge, the lower side and the motor end portion can be rendered untight.

In a further configuration of the invention it can be provided that the seal is arranged radially spaced from the edge embracing the motor end portion on the lower side. Because of this, the annular space can be substantially filled up completely with adhesive, wherein the adhesive covers the shell of the stator housing and additionally parts of the lower side. Because of this a very good heat dissipation via the shell and the lower side as well as a very good vibration damping is made possible. Accordingly, the parts of the lower side and of the shell covered by the adhesive have to be embodied as tight as possible.

Preferentially it can be provided that the diameter of the annular space tapers towards the lower side. Accordingly, the annular space in the region facing away from the motor end portion has a larger diameter than in the region facing the motor end portion.

Preferentially it can be provided that the adhesive ends in the annular space axially spaced from the lower side. The adhesive is introduced into the annular space at the axial upper end of the motor mounting and subsequently flows along the shell in the direction of the lower side. The tapering annular space finally results in that the flow of the adhesive, because of the relatively high viscosity of the adhesive, is stopped, as a result of which the adhesive cannot flow as far as to the lower side or not as far as to the motor end portion. The tapering annular space functions in the manner of a seal, as a result of which an annular seal of the type described above can be omitted. This is advantageous since because of this an additional assembly step, namely the arranging of the seal on the electric motor, can be saved. It is advantageous, furthermore, that the costs during the manufacture of the control device can be lowered since no costs for the manufacture of the seal are incurred.

It does not leave the scope of the present invention when the control device comprises neither a seal of the type described above nor an annular space that is tapering towards the lower side. This is conceivable in particular when the electric motor or the motor end portion are embodied tight, so that it is not mandatorily necessary that regions of the shell, the lower side or the motor end portion are protected from contamination by the adhesive.

In the usual manner, an exhaust gas turbocharger according to the invention comprises a turbine with turbine wheel and a compressor with compressor wheel. Furthermore, the exhaust gas turbocharger can be equipped with a variable turbine geometry in order to control the inflow to the turbine wheel. Alternatively, the exhaust gas turbocharger can be equipped with a wastegate valve with the help of which a bypass bypassing the turbine wheel can be controlled. The exhaust gas turbocharger according to the invention can now be equipped with at least one control device of the type described above, which is provided for actuating the variable turbine geometry or for actuating the wastegate valve.

It is also conceivable that a control device of the type described above is employed for controlling an exhaust flap. A corresponding exhaust system for an internal combustion engine accordingly comprises at least one exhaust pipe conducting exhaust gas, an exhaust flap for controlling a cross section of the exhaust pipe that can be flowed through and a control device of the type described above, wherein the control device is arranged for actuating the exhaust flap.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

According to FIGS. 2 to 5, an electric control device 1 for actuating an actuator 2 comprises an electric motor 3 which has a substantially cylindrical stator housing 4 and a rotor 5 for driving the actuator 2. The stator housing 4 comprises an axial lower side 6 and a circumferential shell 7, wherein the lower side 6 merges into the shell 7 via a circumferential edge 8. On the lower side 6 of the stator housing 4 a central axially projecting motor end portion 9 is formed. An equipment housing 10 contains a substantially cylindrical motor mounting 11 which is sealed at an axial end 12 by a mounting bottom 13 and in which the electric motor 3 is inserted with the lower side 6 up front and attached to the equipment housing 10.

Figure 1:
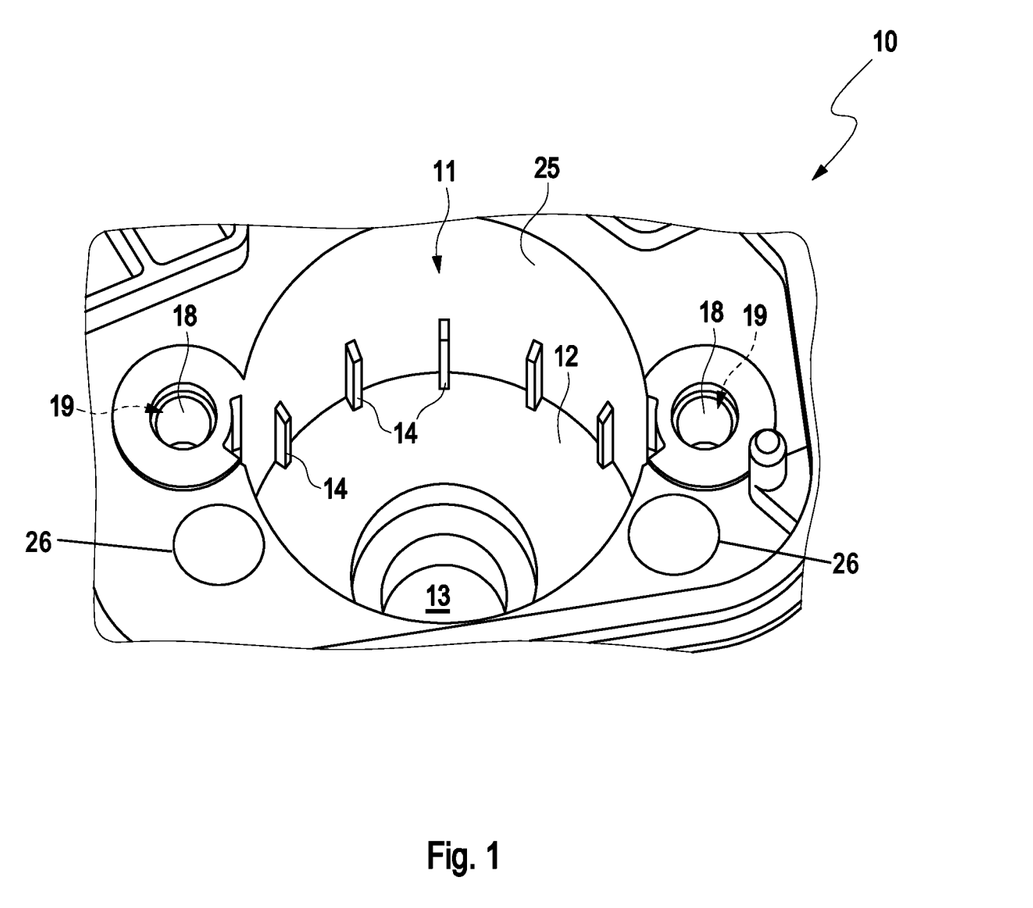
FIG. 1 shows an isometric view of a motor mounting according to the invention.

As illustrated in FIG. 1, ribs 14 radially projecting into the motor mounting 11 are formed on the equipment housing 10, by way of which the electric motor 3 is centred in the motor mounting 11. The number of the ribs 14 shown in FIG. 1 are to be merely understood as being exemplary.

Between the shell 7 of the stator housing 4 and the equipment housing 10, an annular space 16 extending along the shell 7 is formed. Here, the annular space 16 is at least partly filled up with adhesive 17, by way of which the stator housing 4 is attached to the equipment housing 10 in the motor mounting 11 (see FIGS. 2 to 5).

According to FIG. 1, two bores 18 are formed alternatively or additionally to the ribs 14 laterally next to the motor mounting 11, in which two screws 19 which are not shown in the figures engage, as a result of which the electric motor 3 is secured in the motor mounting 11 against axial shifting. It is conceivable that the screws 19 are embodied as self-tapping screws 19 and that by screwing-in the self-tapping screws 19, a thread is formed in the bores 18. The equipment housing 10 is preferentially formed from plastic. The number of the bores 18 or the number of the screws 19 is to be understood to be merely exemplary and it is likewise conceivable that four bores 18 are formed in the motor mounting 11, into which the four screws 19 engage.

Alternatively it is also conceivable that on the equipment housing 10 laterally next to the motor mounting 11 at least two plastic domes 26 are formed, by way of which the electric motor 3 is centred in the motor mounting 11, and that the electric motor 3 is hot-clinched to the at least two plastic domes 26.

Figure 2:
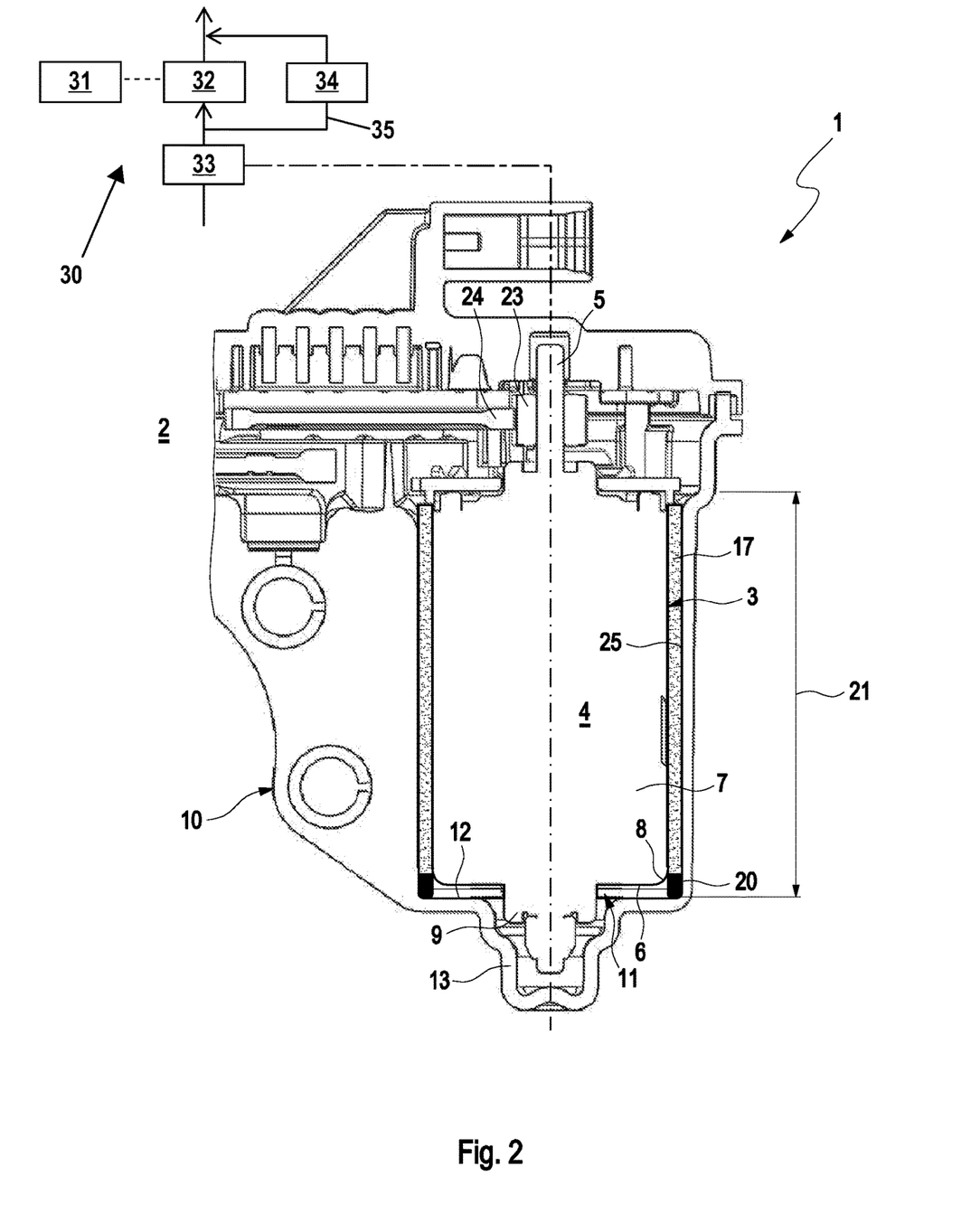
FIG. 2 shows a sectional view of a control device having a seal arranged at an axial end of the motor mounting.
Figure 3:
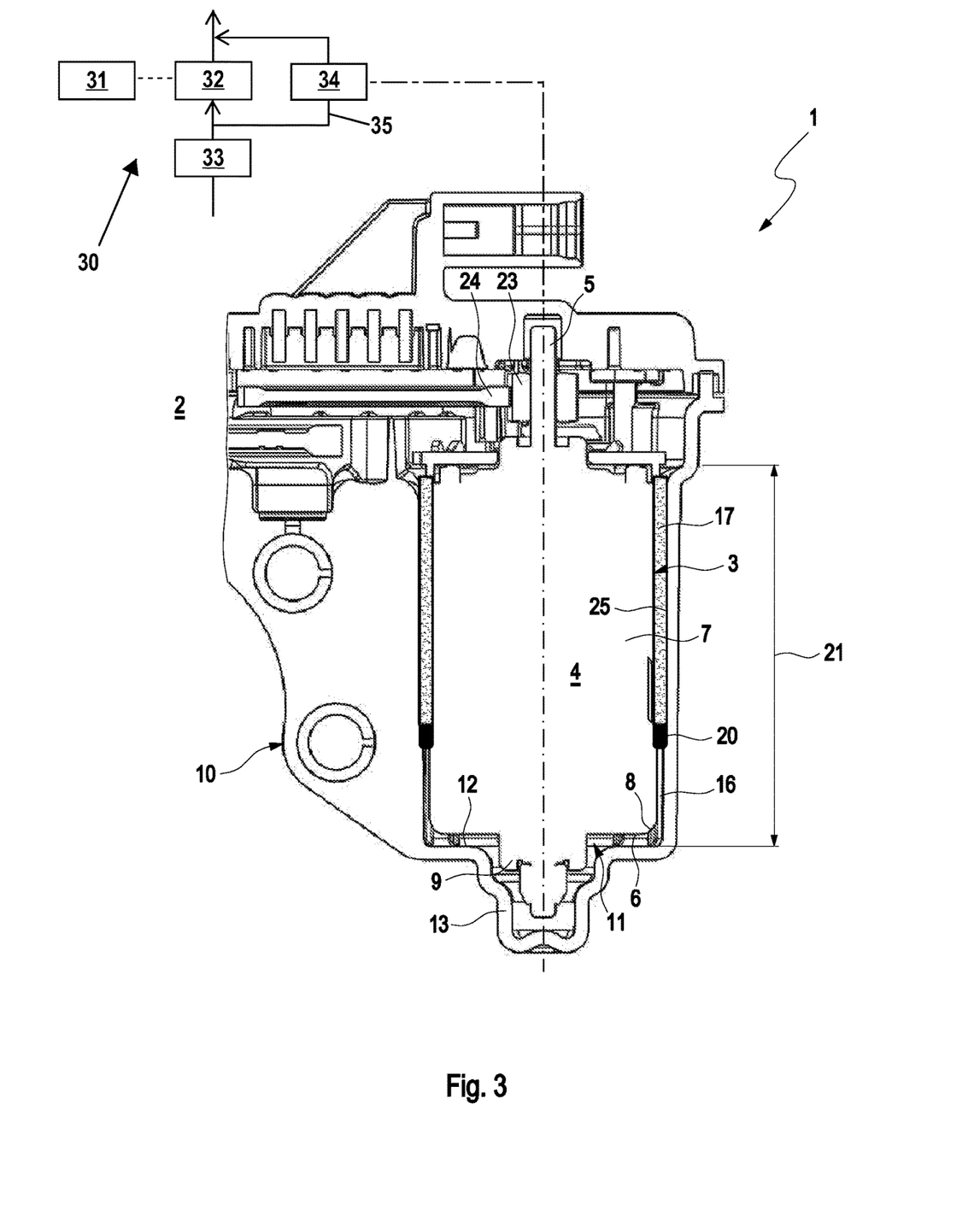
FIG. 3 shows a sectional view of the control device having a seal arranged spaced from the axial end.
Figure 4:
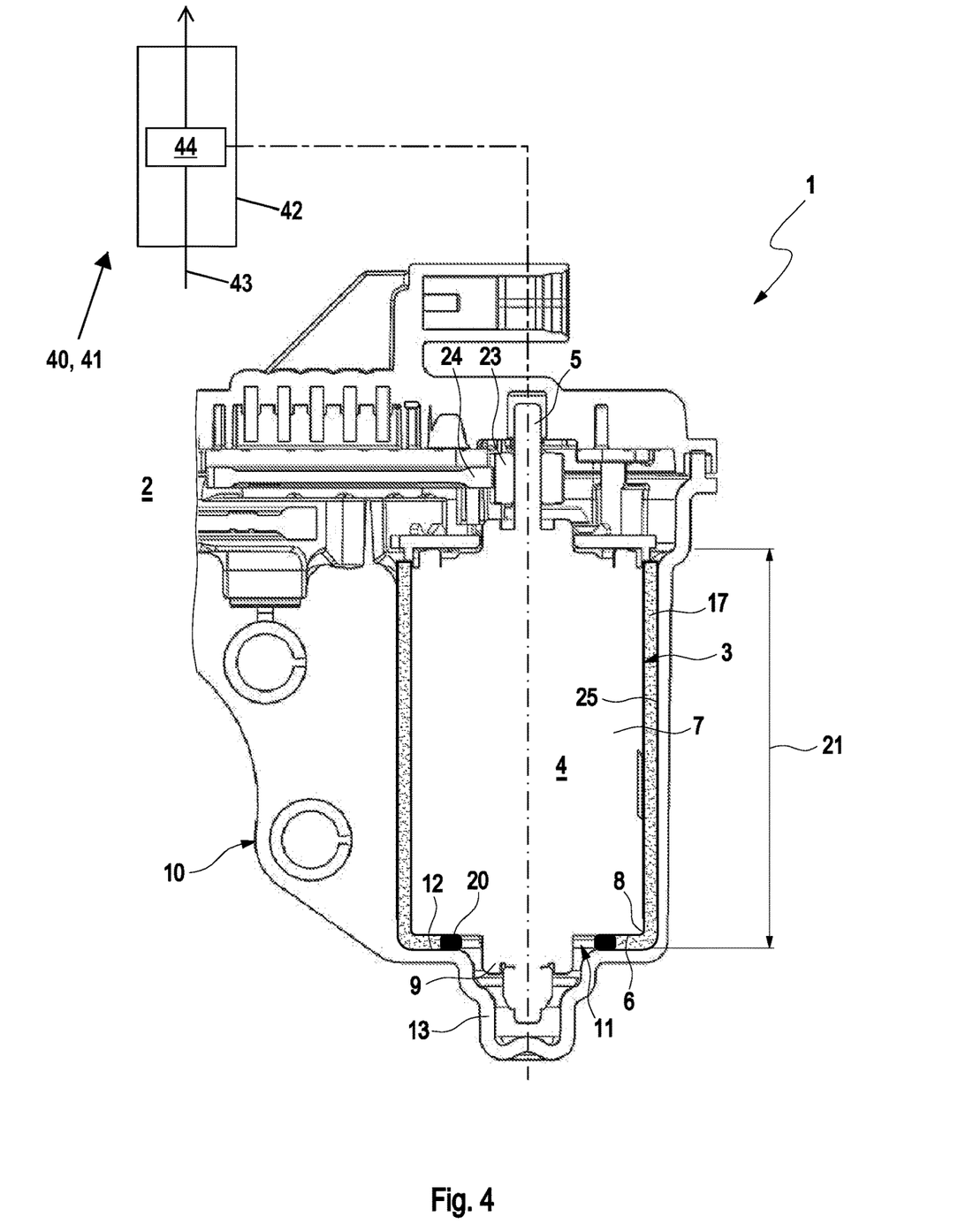
FIG. 4 shows a sectional view of the control device having a seal arranged on a lower side.

As illustrated in FIGS. 2 to 4, the motor end portion 9 and the annular space 16 are fluidically separated from one another by an annular seal 20. Here, the adhesive 7 is exclusively located on a side of the seal 20 facing away from the motor end portion 9 (see FIGS. 2 to 4).

The seal 20 can lie against the stator housing 4 and lie against a housing wall 25 of the equipment housing 10 delimiting the motor mounting 11 (see FIGS. 2 and 3). Here, the seal 20 can be arranged at a height of the edge 8 (see FIG. 2).

According to FIG. 3, the seal 20 can be arranged on the stator housing 4 at approximately a third of an axial height of the motor mounting 11 emanating from the axial end 12, axially spaced from the edge 8. It is also conceivable that the seal 20 is arranged in another place on the stator housing 4 axially spaced from the edge 8.

As illustrated in FIG. 4, the seal 20 can be arranged on the lower side 6 radially spaced from the edge 8 embracing the motor end portion 9. The radial distance from the edge 8 shown in FIG. 4 as far as to the seal 20 must be merely understood to be exemplary.

Figure 5:
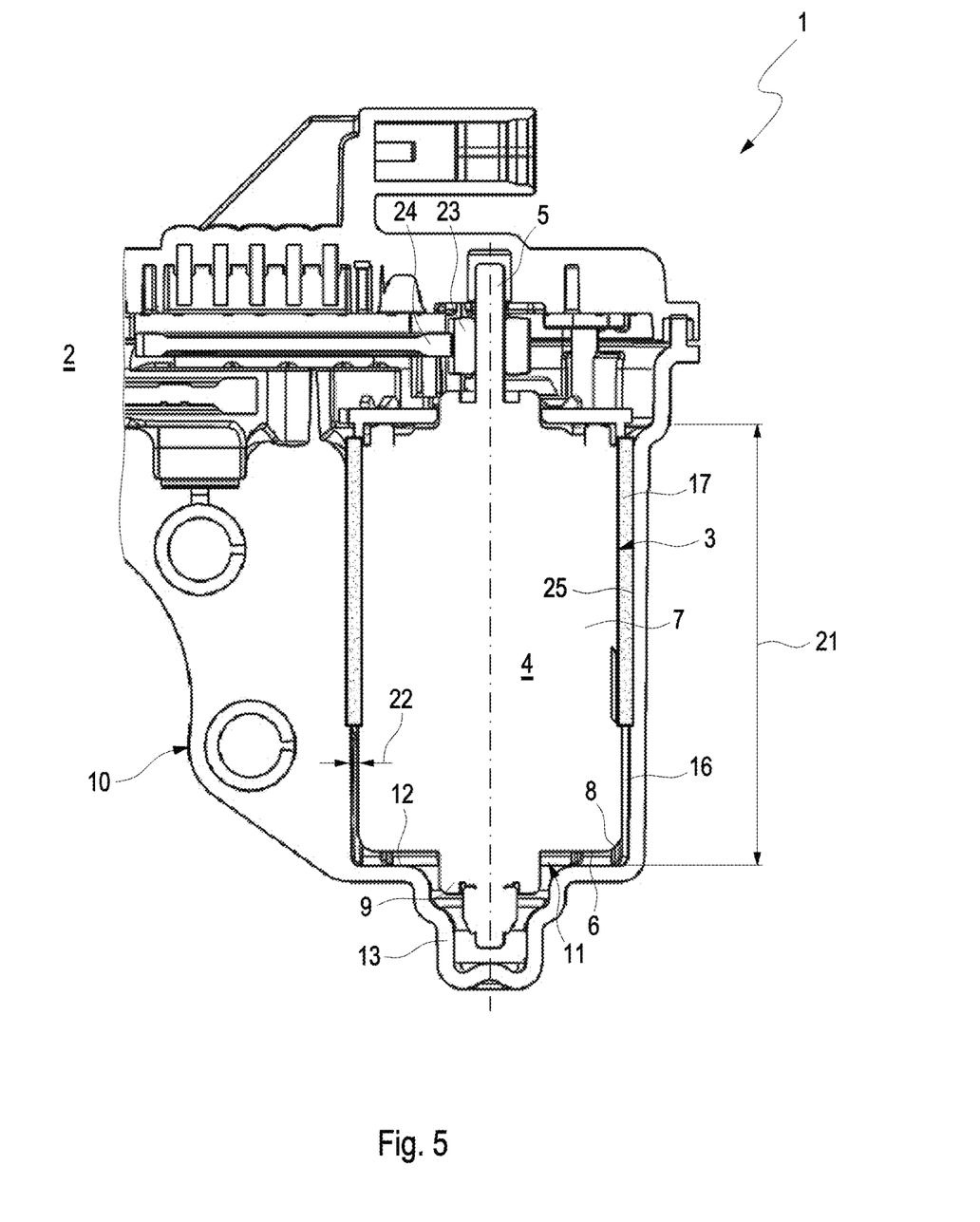
FIG. 5 shows a sectional view of the control device having an annular space tapering towards the lower side.

According to FIG. 5, the seal 20 can be omitted when the diameter 22 of the annular space 16 tapers towards the lower side 6, as a result of which the adhesive 17 because of a relatively high viscosity cannot flow as far as to the motor end portion 9 or not as far as to the lower side 6. Accordingly, the adhesive 17 ends in the annular space 16 axially spaced from the lower side 6. In FIG. 5, approximately one third of the annular space 16 is formed tapering but it is likewise conceivable that for example approximately half of the annular space 16 is formed tapering.

The control device 1 introduced here can be employed for example in an exhaust gas turbocharger 30 (see, e.g., FIGS. 2 and 3). An exhaust gas turbocharger 30 may comprise a turbine 31 with a turbine wheel 32 and a compressor with compressor wheel. Furthermore, the exhaust gas turbocharger 30 may be equipped with a variable turbine geometry 33 in order to control the inflow to the turbine wheel 32. The exhaust gas turbocharger 30 may be equipped with a wastegate valve 34 with the help of which a bypass 35 bypassing the turbine wheel 32 can be controlled. For example, the control device 1 can be utilised for actuating a variable turbine geometry 33 or for actuating a wastegate valve 34.

The control device 1 may be employed for controlling an exhaust flap 44 of an exhaust system 41 (see, e.g., FIG. 4). An exhaust system 41 for an internal combustion engine 40 may comprise at least one exhaust pipe 42 conducting exhaust gas 43, one or more exhaust flaps 44 for controlling a cross section of the exhaust pipe 42 that can be flowed through, and a control device 1. The control device 1 may be arranged for actuating one or more exhaust flaps 44.

As illustrated in FIGS. 2 to 5, the rotor 5 drives a drive pinion 23, wherein the drive pinion 23 drives a gear wheel 24, which is connected to the actuator 2 located outside the equipment housing 10 directly or via one or more gear stages. It is likewise conceivable that the rotor 5 is connected driving the actuator 2 in another manner

The invention claimed is:

1. An electric control device for actuating an actuator, comprising:
    an electric motor including a substantially cylindrical stator housing and a rotor for driving the actuator;
    the stator housing having an axial lower side and a circumferential shell;
    the axial lower side merging into the circumferential shell via a circumferential edge;
    an equipment housing including a substantially cylindrical motor mounting which at an axial end is sealed by a mounting bottom and in which the electric motor is arranged, with the axial lower side facing the mounting bottom, and attached to the equipment housing;
    wherein on the axial lower side a central, axially projecting motor end portion is disposed;
    wherein, in the motor mounting between the circumferential shell of the stator housing and the equipment housing, an annular space extending along the circumferential shell is defined; and
    wherein the annular space is at least partly filled with an adhesive which attaches the stator housing to the equipment housing in the motor mounting.

2. The control device according to claim 1, further comprising a plurality of ribs arranged on the equipment housing and radially projecting into the motor mounting via which the electric motor is centred in the motor mounting.

3. The control device according to claim 2, wherein the plurality of ribs contact the stator housing and clamp the electric motor in the motor mounting.

4. The control device according to claim 1, further comprising at least two bores disposed laterally next to the motor mounting in the equipment housing into which at least two screws engage such that the electric motor is secured in the motor mounting against axial shifting.

5. The control device according to claim 4, wherein:
    the at least two screws are self-tapping screws; and
    screwing-in the at least two self-tapping screws provides a thread in the at least two bores.

6. The control device according to claim 1, further comprising at least two plastic domes disposed on the equipment housing laterally next to the motor mounting via which the electric motor is centred in the motor mounting, wherein the electric motor is hot-clinched to the at least two plastic domes.

7. The control device according to claim 1, wherein the motor end portion and the annular space are fluidically separated from one another via an annular seal.

8. The control device according to claim 7, wherein the adhesive is exclusively disposed on a side of the annular seal facing away from the motor end portion.

9. The control device according to claim 7, wherein the annular seal lies against the stator housing and against a housing wall of the equipment housing delimiting the motor mounting.

10. The control device according to claim 9, wherein the annular seal is axially arranged at a height of the circumferential edge.

11. The control device according to claim 9, wherein the annular seal is arranged on the stator housing axially spaced from the circumferential edge.

12. The control device according to claim 11, wherein the annular seal is arranged on the stator housing axially spaced from the axial end of the motor mounting by a distance equal to approximately a third of an axial height of the motor mounting.

13. The control device according to claim 7, wherein the annular seal is arranged on the axial lower side radially spaced from the circumferential edge embracing the motor end portion.

14. The control device according to claim 1, wherein a diameter of the annular space tapers towards the axial lower side.

15. The control device according to claim 14, wherein at least one of ⅓ and ½ of an axial length of the annular space is tapered.

16. The control device according to claim 1, wherein, within the annular space, the adhesive is disposed axially spaced apart from the axial lower side.

17. The control device according to claim 1, wherein the adhesive has a thermal conduction coefficient that is greater than a thermal conduction coefficient of the equipment housing.

18. An exhaust gas turbocharger for an internal combustion engine, comprising a turbine including a turbine wheel, a variable turbine geometry for controlling an inflow to the turbine wheel, and a control device for actuating the variable turbine geometry, the control device including:
    an electric motor including a substantially cylindrical stator housing and a rotor for driving the actuator, the stator housing having an axial lower side that merges into a circumferential shell via a circumferential edge;

an equipment housing including a substantially cylindrical motor mounting which at an axial end is sealed by a mounting bottom, the electric motor arranged within the cylindrical motor mounting such that the axial lower side faces the mounting bottom;

a central, axially projecting motor end portion disposed on the axial lower side;

wherein an annular space is defined in the motor mounting between the circumferential shell and the equipment housing and extends along the circumferential shell;

wherein the annular space is at least partly filled with an adhesive coupling the stator housing to the equipment housing in the motor mounting; and wherein the motor end portion and the annular space are fluidically separated from one another via an annular seal.

19. An exhaust gas turbocharger for an internal combustion engine, comprising a turbine including a turbine wheel, a wastegate valve for controlling a bypass bypassing the turbine wheel, and a control device for actuating the wastegate valve, the control device including:

an electric motor including a substantially cylindrical stator housing and a rotor for driving the actuator, the stator housing having an axial lower side that merges into a circumferential shell via a circumferential edge;

an equipment housing including a substantially cylindrical motor mounting which at an axial end is sealed by a mounting bottom, the electric motor arranged within the cylindrical motor mounting such that the axial lower side faces the mounting bottom;

a central, axially projecting motor end portion disposed on the axial lower side;

wherein an annular space is defined in the motor mounting between the circumferential shell and the equipment housing and extends along the circumferential shell;

wherein the annular space is at least partly filled with an adhesive coupling the stator housing to the equipment housing in the motor mounting; and wherein a diameter of the annular space tapers towards the axial lower side.

20. An exhaust system for an internal combustion engine, comprising at least one exhaust pipe conducting exhaust gas, an exhaust flap for controlling a cross section of the exhaust pipe which is flowable through, and a control device for actuating the exhaust flap, the control device including:

an electric motor including a substantially cylindrical stator housing and a rotor for driving the actuator, the stator housing having an axial lower side that merges into a circumferential shell via a circumferential edge;

an equipment housing including a substantially cylindrical motor mounting which at an axial end is sealed by a mounting bottom, the electric motor arranged within the cylindrical motor mounting such that the axial lower side faces the mounting bottom;

a central, axially projecting motor end portion disposed on the axial lower side;

wherein an annular space is defined in the motor mounting between the circumferential shell and the equipment housing and extends along the circumferential shell;

wherein the annular space is at least partly filled with an adhesive coupling the stator housing to the equipment housing in the motor mounting; and wherein, within the annular space, the adhesive is disposed axially spaced apart from the axial lower side.

* * * * *